C. H. POWELL.
HEAD BLOCK.
APPLICATION FILED OCT. 27, 1913.
1,142,981.
Patented June 15, 1915.
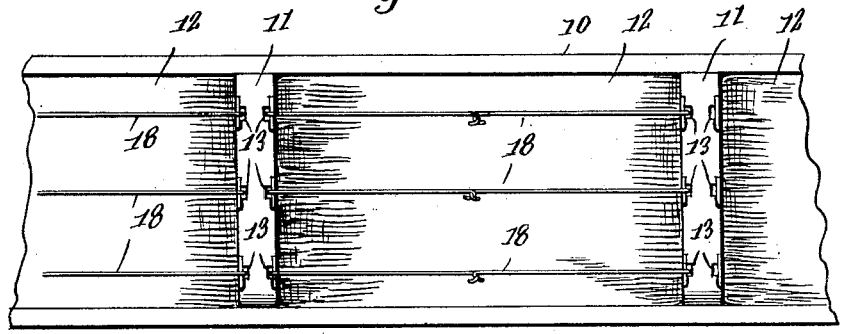
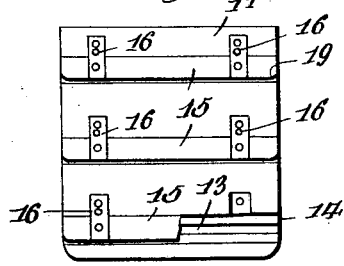
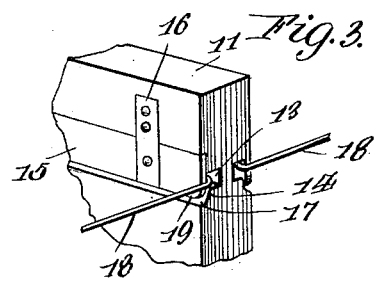
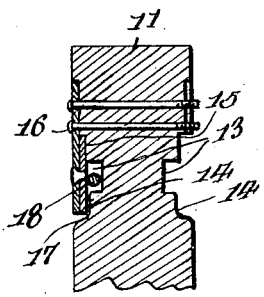
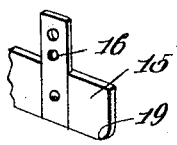
Witnesses
G. M. Spring
Ross J. Woodward
Inventor
Charles H. Powell,
By Richard Bowen,
his Attorney
THE NORRIS PETERS CO., PHOTO-LITHO., WASHINGTON, D. C.

UNITED STATES PATENT OFFICE.

CHARLES H. POWELL, OF DALKENA, WASHINGTON.

HEAD-BLOCK.

1,142,981.

Specification of Letters Patent. Patented June 15, 1915.

Application filed October 27, 1913. Serial No. 797,560.

*To all whom it may concern:*

Be it known that I, CHARLES H. POWELL, a citizen of the United States, residing at Dalkena, in the county of Pend Oreille and State of Washington, have invented certain new and useful Improvements in Head-Blocks, of which the following is a specification.

This invention relates to a head block and the principal object of the invention is to provide a head block which is so constructed that the grooves through which the wires are intended to pass will not become choked by the hay and the wires prevented from being passed through the slots.

Another object of the invention is to provide improved closures for the slots, the closures being so constructed that they will keep the hay out but will not prevent the wires from being withdrawn from the blocks after the wires have been tightened about the hay.

This invention is illustrated in the accompanying drawings wherein:—

Figure 1 is a top plan view of a portion of a baling press with the improved head blocks shown in place; Fig. 2 is a front elevation of one of the head blocks with one of the protecting strips broken away; Fig. 3 is a fragmentary perspective view of a corner of one of the head blocks; Fig. 4 is a sectional view through a portion of one of the head blocks; and, Fig. 5 is a perspective view of one end of one of the protecting strips.

In the accompanying drawings, the numeral 10 indicates the body portion of the baling press and the numeral 11 indicates the head blocks which are placed between the bales 12. Each of these head blocks is formed from a block of wood or any other suitable material and is provided with transversely extending grooves 13 which have enlarged outer end portions 14. Closure strips 15 which are preferably formed of metal or which may be formed of other suitable material, are placed in the enlarged outer end portions of the grooves 13 and are yieldably held in place by the spring strips 16. These closure strips 15 are held tightly in place by the strips 16 but terminate short of the curved edge 17 of the grooves 14 so that the wires 18 may be readily drawn out of the grooves 13 after they have been tightened about the bale as shown in Fig. 1. It should also be noted that the corners 19 of the strips 15 are curved, this being done so that the wires may more easily pass out of the grooves 13.

In the operation of this press, the hay is fed into the body portion 10 by suitable mechanism and when a sufficient amount of hay is in place a head block is put into the machine and then more hay fed into the machine. The head blocks are therefore to be positioned between the sections of hay which it is desired to bale as shown in Fig. 1. The wires are passed up through the slots 13 and their ends are then carried across the bale and twisted as shown in Fig. 1 so that the hay between the two head blocks will be tightly bound together. When the bales are to be removed from the body portion 10, they are drawn out of the end of the body portion and are then moved sidewise across the head blocks so that the wires will be drawn out of the grooves 13 past the free ends of the closure strips 15. These closure strips prevent any hay from entering the grooves 13 and therefore the grooves cannot become choked so that it will be impossible for the wires to be passed through these grooves. A great deal of time will therefore be saved since it will not be necessary to stop the operation of the press in order to tighten up a bale of hay as would be the case if the grooves became choked.

What is claimed is:—

1. A head block provided with a groove having an enlarged mouth, a closure strip positioned within the enlarged mouth of said groove, and resilient strips yieldably holding said closure strip within the mouth of said groove.

2. A head block provided with a groove having an enlarged mouth, a closure strip positioned in the enlarged mouth of said groove and terminating short of one edge, and means for yieldably holding the said closure strip within the mouth of said groove.

3. A head block provided with a groove, a closure strip fitting within said groove, and means for yieldably holding said closure strip within said groove.

4. A head block provided with a groove, a closure strip fitting within said groove, and resilient strips connecting said closure strip with said head block wherein the free end of said closure strip may be moved away from said block.

5. A head block provided with a groove, and resilient means for closing the entrance to said groove normally fitting within the groove and moving away from said groove to permit a wire to be withdrawn from the groove.

6. A head block provided with a groove, a closure for said groove, and means for yieldably holding said closure in a position to close said groove.

7. A head block provided with a groove, a closure for said groove, and resilient means for normally holding said closure in an operative position.

8. A head block provided with a groove, and a yieldable closure for said groove normally remaining in an operative position.

In testimony whereof I affix my signature in presence of two witnesses.

CHARLES H. POWELL.

Witnesses:
OSCAR N. MCLAUGHLIN,
EDWARD C. PERROTT.

Copies of this patent may be obtained for five cents each, by addressing the "Commissioner of Patents, Washington, D. C."